US008099137B2

(12) United States Patent  
Buti et al.

(10) Patent No.: US 8,099,137 B2  
(45) Date of Patent: Jan. 17, 2012

(54) NETWORK SUPPORT FOR MOBILE SPECIAL ALERTING

(75) Inventors: Ajay K. Buti, Naperville, IL (US); Sanjeev Mahajan, Naperville, IL (US)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 12/927,127

(22) Filed: Nov. 8, 2010

(65) Prior Publication Data

US 2011/0065483 A1 Mar. 17, 2011

(51) Int. Cl.  
*H04M 1/00* (2006.01)  
*H04B 1/38* (2006.01)

(52) U.S. Cl. ....... 455/567; 455/401; 455/521; 340/58.7; 340/59.7; 379/418

(58) Field of Classification Search .................. 455/41.1, 455/41.2, 401, 404.1, 521, 567; 340/7.57, 340/7.58, 7.59, 7.6, 7.61, 7.62; 379/418  
See application file for complete search history.

(56) References Cited

U.S. PATENT DOCUMENTS

| | | | | |
|---|---|---|---|---|
| 5,828,742 A * | 10/1998 | Khalid et al. | ................. | 379/199 |
| 2002/0141413 A1* | 10/2002 | Schlaegl | ...................... | 370/394 |
| 2003/0109288 A1* | 6/2003 | Carley et al. | ................. | 455/567 |
| 2007/0190991 A1* | 8/2007 | Cargille | ...................... | 455/415 |

* cited by examiner

*Primary Examiner* — Tuan H Nguyen

(74) *Attorney, Agent, or Firm* — Carmen Patti Law Group, LLC

(57) ABSTRACT

An apparatus in one example has: a mobile terminal having at least first and second modes of operation; and a special alerting code; wherein, in response to the calling party entering the special alerting code, the mobile terminal changes from the first mode of operation to the second mode of operation. The system allows a mobile terminal in a silent/meeting mode to go into a vibrate and/or ring mode when a calling party enters a special alerting code.

20 Claims, 2 Drawing Sheets

NETWORK SUPPORT FOR MOBILE SPECIAL ALERTING

TECHNICAL FIELD

The invention relates generally to telecommunication systems and, more specifically, to a system that allows a mobile terminal in a silent/meeting mode to go into a vibrate and/or ring mode when a calling party enters a special alerting code.

BACKGROUND

Wireless communication systems are constantly evolving. System designers are continually developing greater numbers of features for both service providers as well as for the end users. In the area of wireless phone systems, cellular based phone systems have advanced tremendously in recent years. Wireless phone systems are available based on a variety of modulation techniques and are capable of using a number of allocated frequency bands. Available modulation schemes include analog FM and digital modulation schemes using Time Division Multiple Access (TDMA) or Code Division Multiple Access (CDMA). Each scheme has inherent advantages and disadvantages relating to system architecture, frequency reuse, and communications quality. However, the features the manufacturer offers to the service provider and which the service provider offers to the consumer are similar between the different wireless systems.

Typically, a mobile terminal such as a cell phone may have a plurality of different alerting modes such as silent/meeting mode (i.e. a mode in which the phone does not ring or vibrate), vibrate mode, and ring mode. The ring mode may also be a vibrate and ring mode.

There are times when a mobile terminal user will put a mobile terminal in a silence/meeting mode and then forget to change the silent/meeting mode back to the ring mode and/or vibrate mode. In the mean time a caller keeps trying to get in touch with the mobile terminal user (perhaps for an emergency). However, because the mobile terminal is still in the silent/meeting mode, the mobile terminal user does not know to answer the call.

Thus, there is a need in the art for a system in which a mobile terminal in a silent/meeting mode may be placed into a vibrate and/or ring mode when a calling party needs to contact the mobile terminal.

SUMMARY

One implementation of the present method and apparatus encompasses an apparatus. The apparatus comprises: a mobile terminal having at least first and second modes of operation; and a special alerting code; wherein, in response to receiving the special alerting code, the network alerts the mobile terminal to change from the first mode of operation to the second mode of operation.

Another implementation of the present method and apparatus encompasses a method. The method comprises: sending a special alerting code to the network; the network sending a "Change-Alerting" message to the mobile upon receipt of special alerting code; a mobile terminal having at least first and second modes of operation; and changing, in response to the "Change-Alerting" message, the mobile terminal from the first mode of operation to the second mode of operation.

DESCRIPTION OF THE DRAWINGS

Features of exemplary implementations of the invention will become apparent from the description, the claims, and the accompanying drawings in which:

DETAILED DESCRIPTION

One methodology according to the present method and apparatus is for the mobile terminal to go from a silent or meeting mode into a vibrate and/or ring mode, or alternatively from a vibrate mode to a ring mode or a vibrate and ring mode, if a predetermined code has been entered by a calling party. Another methodology is for the mobile terminal to go from a silent or meeting mode into a vibrate mode for a brief moment, which may be user defined, after a certain interval, which may also be user defined. Thus, the mobile terminal user may be reminded that the mobile terminal is still in a silent or meeting mode.

Figure 1:
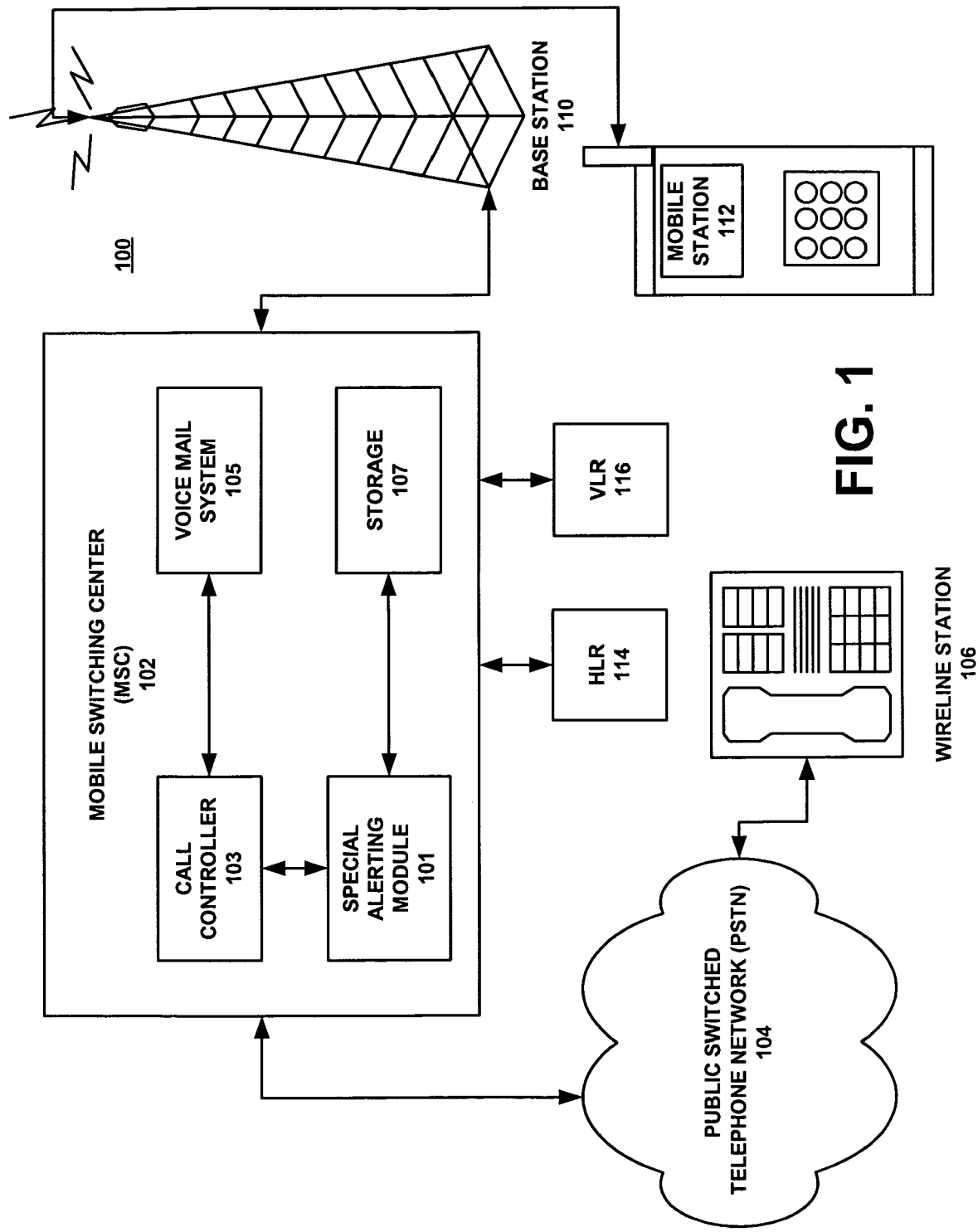
FIG. 1 is a representation of one implementation of an apparatus that provides network support for changing a mobile terminal from a silent/meeting mode to a vibrate and/or ring mode when a calling party needs to contact the mobile terminal.

FIG. 1 is a representation of one implementation of an apparatus that provides network support for changing a mobile terminal 112 from a silent/meeting mode to a vibrate and/or ring mode when a calling party needs to contact the mobile terminal. The mobile terminal 112, such as a cell phone, may have a plurality of different modes of operation, such as a silent/meeting mode (i.e. a mode in which the phone does not ring or vibrate), a vibrate mode, a ringing mode, and a vibrate/ringing mode.

Referring to FIG. 1, a network 100 is depicted for at least one mobile terminal 112 of a plurality of mobile terminals operatively connected to a communication network. Although the present system and method may be used with any type of network (wired and wireless, for example), the subscriber may typically be a mobile subscriber who uses a mobile terminal 112 (also referred to as mobile phone, a cell phone, mobile handset, or car phone). The network (or telecommunication network) 100 may have a mobile switching center (MSC) 102, which may have a voice mail system 105 that may be contained in the MSC 102 or be separate and operatively coupled to the MSC 112. The network 100 may be, or may be part of, one or more of a telephone network, a local area network ("LAN"), the Internet, and a wireless network. In the depicted embodiment, a public switched telephone network (PSTN) 104 is operatively coupled to the MSC 102. The PSTN 104 routes calls to and from mobile users through the MSC 102. The PSTN 104 also routes calls from and to wireline stations 106. The MSC 102 may also be connected to one or more base stations (BS) 110. Each of the base stations 110 communicates with mobile terminal(s) 112 in its service area. The PSTN 104 generally can be implemented as the worldwide voice telephone network accessible to all those with telephones and access privileges (e.g., AT&T long distance network).

Each of the mobile terminals 112 may have a home location register (HLR) 114 where data about each of the mobile terminals 112 resides. Some of the mobile terminals 112 may be remotely located from their home location, and in that case, a visiting location register (VLR) 116 is set up locally for each mobile terminal 112 that is visiting in its service area. HLR 114 can be implemented as a permanent SS7 database utilized in cellular networks, such as, but not limited to, for example, AMPS (Advanced Mobile Phone System), and GSM (Global System for Mobile Communications).

HLR 114 may be utilized generally to identify/verify a subscriber, and also contains subscriber data related to features and services. HLR 114 is generally utilized not only when a call is being made within a coverage area supported by a cellular provider of record, but also to verify the legitimacy and to support subscriber features when a subscriber is away from his or her home area. VLR 116, on the other hand, may be implemented as a local database maintained by the cellular provider whose territory is being roamed. Mobile terminal 112 may be implemented as a cellular device, personal communication device, short message service device or wireless communications device (e.g., a wireless personal digital assistant).

The MCS 102 may have, or be operatively connected to, components of a system for special alerting of mobile terminals by a telecommunication network. Such components in some embodiments may include: special alerting module 101, and a call controller 103 and storage 107 in the MCS 102.

The mobile terminal 112 may have at least first and second modes of operation. A "Change-Alerting" message may be sent to the mobile terminal 112 by the MSC 102 upon receipt of the special alerting code. In response to receiving the "Change-Alerting" message, the mobile terminal changes from the first mode of operation to the second mode of operation.

In one embodiment a calling terminal, such as wireline station 106, may enter the special alerting code, the special alerting code having been provide to the calling terminal 106 party by the mobile terminal 112 owner, for example. The calling terminal may be the wireline station 106, but it may also be any other type of terminal, such as a mobile terminal, a cell phone, a PDA, or in general any type of wired or wireless device. The calling terminal 106 may then send the special alerting code to the MSC 102. The special alerting code may be entered at the calling terminal 106 during receiving a ring back tone at the calling terminal 106, or during receiving a voice mail prompt at the calling terminal 106. The MSC 102 may then send the "Change-Alerting" message to the mobile terminal 112. In an embodiment of the present method and apparatus the mobile terminal 112 may have a silent mode, a vibrate mode, a ring mode, and a vibrate and ring mode.

A storage 107 may be operatively coupled to the special alerting module 101. The storage 107 may store data or the equivalent thereof for use in the present method as described below. The data may be, for example, special alerting code the alerting change interval and vibrate interval.

The "special alerting code" may be defined in the network.

The "alerting change interval". This interval specifies the period after which the silent mobile will revert back to the "vibrate mode" and vibrate to remind the subscriber that the mobile terminal is in silent mode. This may be a parameter defined on the terminal. Alternatively, "alerting change interval" may be defined in the network, but then additional messaging is required between the mobile terminal and the network every time the terminal is put into silence mode. The terminal may inform the network that it is now in the silent mode by using a new message "silent alert". The network may then send the terminal a new "change alerting" message to request it to change to vibrate mode after the "alerting change interval".

The "vibrate period" specifies how long the mobile terminal will stay in vibrate mode before reverting back to silence mode. This may be a parameter defined on the terminal. Alternatively, the "vibrate period" may be defined in the network. In this case the network will provide the "vibrate period" in the "change alerting" message.

Figure 2:
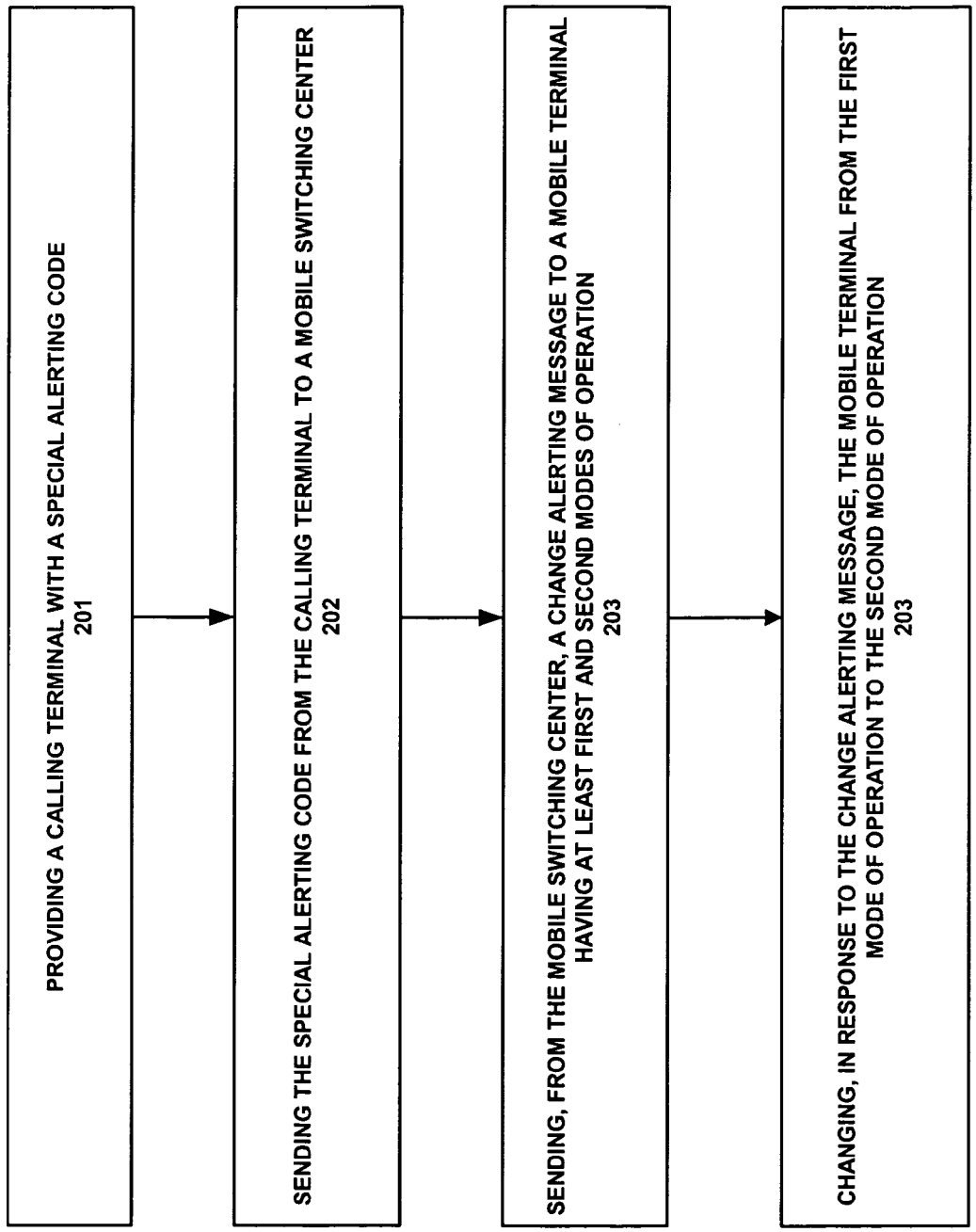
FIG. 2 is a representation of one exemplary flow diagram according to the present method.

FIG. 2 is a representation of one exemplary flow diagram according to the present method. In this embodiment of the present method, a calling terminal may be provided with the special alerting code (201). The calling terminal sends the special alerting code to the MSC 102 (202). The MSC 102 sends a "Change Alerting" message to a mobile terminal having at least first and second modes of operation (203). In response to the "Change Alerting" message, the mobile terminal changes from the first mode of operation to the second mode of operation (204), thus alerting the user to the incoming call.

The special alerting code may be entered at the calling terminal during receiving a ring back tone at the calling terminal. Alternatively, the special alerting code may be entered at the calling terminal during receiving a voice mail prompt at the calling terminal.

In another embodiment a mobile terminal may be in a silent mode and the user of the mobile terminal may define an interval after which the mobile terminal will automatically go into vibrate mode for a brief moment and then back to the silent mode. The mobile owner may set the "alerting change interval" and set the "vibrate period" in the mobile terminal or in the network.

If the "alerting change interval" and the "vibrate period" are set in the terminal, then after the "alerting change interval" the mobile terminal will vibrate for the "vibrate period" and then go back into silent mode. During the "vibrate period" the display on the mobile terminal may show that the terminal is in silent mode. Alternatively, if the "alerting change interval" and "vibrate period" are set in the network the network will send a "change alerting" message to the mobile terminal after expiration of the "alerting change interval". This message may also include the "vibrate period". This will cause the mobile terminal to vibrate for the "vibrate period" and then go back into silent mode. During the "vibrate period" the display will show that the terminal is in silent mode.

The present apparatus in one example may comprise a plurality of components such as one or more of electronic components, hardware components, and computer software components. A number of such components may be combined or divided in the apparatus.

The present apparatus in one example may employ one or more computer-readable signal-bearing media. The computer-readable signal-bearing media may store software, firmware and/or assembly language for performing one or more portions of one or more embodiments. The computer-readable signal-bearing medium in one example may comprise one or more of a magnetic, electrical, optical, biological, and atomic data storage medium. For example, the computer-readable signal-bearing medium may comprise floppy disks, magnetic tapes, CD-ROMs, DVD-ROMs, hard disk drives, and electronic memory. In another example, the computer-readable signal-bearing medium may comprise a modulated carrier signal transmitted over a network comprising or coupled with the apparatus, for instance, one or more of a telephone network, a local area network ("LAN"), a wide area network ("WAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A method comprising:
   changing an alerting mode of a mobile terminal from an initial alerting mode to a first alerting mode and in response to changing the alerting mode to the first alerting mode communicating a first message via a telecommunications network where the first message comprises an indication of the change from the initial alerting mode to the first alerting mode;
   changing the alerting mode from the first alerting mode to a second alerting mode in response to receiving at the mobile terminal a second message communicated via a telecommunications network, where the second message is received after expiration of a first timer interval, and the second message comprises a second timer interval;
   the mobile terminal changes back to the first alerting mode after expiration of the second timer interval;
   wherein the second alerting mode and the initial alerting mode comprises one of a silent mode, a vibrate mode, a ring mode, and a vibrate and ring mode; and
   wherein the first alerting mode comprises one of a silent mode and a vibrate mode.

2. The method of claim 1, wherein the first alerting mode is a silent mode and the second alerting mode is one of a ring mode, vibrate mode, and ring and vibrate mode.

3. The method of claim 1, wherein the first alerting mode is a vibrate mode and the second alerting mode is one of a ring mode, and ring and vibrate mode.

4. The method of claim 1, wherein the mobile terminal is configured to receive a third message that is communicated to the mobile terminal in response to a special alerting code, where the third message is sent while the mobile terminal is in the first alerting mode and in response receiving the third message the mobile terminal changes to the second alerting mode.

5. The method of claim 4, wherein the special alerting code is entered by a calling terminal.

6. The method of claim 4, wherein the first timer interval and the second timer interval are stored on the mobile terminal and the mobile terminal changes to the first alerting mode after expiration of the first timer interval and remains in the first alerting mode for a duration of the second timer interval.

7. The method of claim 6, wherein the mobile terminal reverts to the first alerting mode after expiration of the second timer interval.

8. An apparatus comprising:
   a mobile terminal wherein after changing from an initial alerting mode to a first alerting mode, the mobile terminal receives via a telecommunications network a first message after expiration of a first timer interval where the first message comprises a second timer interval;
   wherein in response to receiving the first message, the mobile terminal changes from the first alerting mode to a second alerting mode for a duration of the second timer interval;
   wherein at expiration of the second timer interval, the mobile terminal reverts to the first alerting mode.

9. The apparatus of claim 8 wherein the first alerting mode is the silent alerting mode and the second alerting mode is one of a ring mode, vibrate mode, and ring and vibrate mode.

10. The apparatus of claim 8 wherein the first alerting mode is a vibrate mode and the second alerting mode is one of a ring mode, and ring and vibrate mode.

11. The apparatus of claim 8 wherein:
    the mobile terminal is configured to receive a second message that is communicated to the mobile terminal in response to a special alerting code, where the second message is sent while the mobile terminal is in the first alerting mode and in response receiving the second message the mobile terminal changes to the second alerting mode.

12. The apparatus of claim 11 wherein the special alerting code is communicated by a calling terminal.

13. The apparatus of claim 8, wherein the first timer interval and the second timer interval are stored on the mobile terminal and the mobile terminal changes to the first alerting mode after expiration of the first timer interval and remains in the first alerting mode for a duration of the second timer interval.

14. The apparatus of claim 13, wherein the mobile terminal reverts to the first alerting mode after expiration of the second timer interval.

15. A call controller that receives a first message indicating a change from an initial alerting mode to a first alerting mode;
    wherein, after expiration of a first timer interval, the call controller communicates a second message comprising a second timer interval, where the second message indicates a change from the first alerting mode to a second alerting mode; and
    the second timer interval indicates a timer interval after which a reversion from the second alerting mode to the first alerting mode occurs.

16. The call controller of claim 15 wherein the first alerting mode is a silent mode and the second alerting mode is one of a ring mode, vibrate mode, and ring and vibrate mode.

17. The call controller of claim 15 wherein the first alerting mode, is a vibrate mode and the second alerting mode is one of a ring mode, and ring and vibrate mode.

18. The call controller of claim 15, wherein the call controller receives a third message, sent in response to a special alerting code, where the third message is received before expiration of the first tinier interval, and in response to receiving the third message the call controller communicates a fourth message indicating a change from the first alerting mode to the second alerting mode.

19. The call controller of claim 18, wherein the special alerting code is sent by a calling terminal that is communicatively coupled with a communication network, where the special alerting code is provided to the calling terminal while the calling terminal is receiving one of a ringback tone and a voice-mail prompt.

20. The call controller of claim 19 wherein the special alerting code is provided to the calling party by the called party.

* * * * *